(12) United States Patent
Kitagawa et al.

(10) Patent No.: US 7,068,062 B2
(45) Date of Patent: Jun. 27, 2006

(54) FAULT DETECTION APPARATUS OF DIRECT-CURRENT MOTOR DRIVE BRIDGE CIRCUIT

(75) Inventors: Susumu Kitagawa, Tochigi (JP); Yutaka Negishi, Tochigi (JP); Takahiro Kasuga, Tochigi (JP); Takuya Narasaki, Tochigi (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/639,933

(22) Filed: Aug. 13, 2003

(65) Prior Publication Data

US 2004/0189318 A1 Sep. 30, 2004

(30) Foreign Application Priority Data

Mar. 26, 2003 (JP) ............................. 2003-084926

(51) Int. Cl.
*G01R 31/34* (2006.01)
(52) U.S. Cl. ........................................ 324/772; 324/523
(58) Field of Classification Search ........ 324/522–523, 324/651, 772, 648; 318/907.2
See application file for complete search history.

(56) References Cited

U.S. PATENT DOCUMENTS

| | | | | |
|---|---|---|---|---|
| 5,329,238 A | * | 7/1994 | Hofsass et al. ............. | 324/522 |
| 5,532,562 A | * | 7/1996 | Yasuda ........................ | 318/439 |
| 5,602,735 A | * | 2/1997 | Wada ........................... | 701/41 |
| 5,659,472 A | * | 8/1997 | Nishino et al. ............... | 701/41 |
| 6,094,021 A | * | 7/2000 | Noro et al. .................. | 318/138 |

FOREIGN PATENT DOCUMENTS

| | | | |
|---|---|---|---|
| JP | 04317861 | * | 11/1992 |
| JP | 0919450 A1 | * | 6/1999 |
| JP | 3020038 | | 3/2000 |

* cited by examiner

*Primary Examiner*—Vincent Q. Nguyen
*Assistant Examiner*—Marina Kramskaya
(74) *Attorney, Agent, or Firm*—Orum & Roth LLC

(57) ABSTRACT

In a direct current motor drive bridge circuit structured such that a pair of forward rotation switching elements and a pair of reverse rotation switching elements are alternately connected annularly, a direct-current motor is interposed between diagonal node points on one side, and a power source voltage is applied to a portion between diagonal node points on another side via an existing resistance. A fault detection apparatus of the direct-current motor drive bridge circuit is provided with a fault detection circuit for detecting an electric potential of the one node point r to which the power source voltage is applied via the existing resistance and for detecting a closed-circuit fault of the switching elements and on the basis of a fluctuation of the electric potential.

7 Claims, 2 Drawing Sheets

US 7,068,062 B2

FAULT DETECTION APPARATUS OF DIRECT-CURRENT MOTOR DRIVE BRIDGE CIRCUIT

BACKGROUND OF THE INVENTION

1. Field of the Invention

The present invention relates to a fault detection apparatus for detecting a closed-circuit fault of a switching element in a bridge circuit by a switching element driving a direct-current motor.

2. Description of the Related Art

When forward-rotating, a direct-current drive bridge circuit of a direct-current motor turns off both of a pair of reverse rotation switching elements, and sets one of a pair of forward rotation switching elements to a full-time on state and executes an on-off duty control of another.

Further, when reverse rotating the direct-current motor, the circuit turns off both of a pair of forward rotation switching elements, and sets one of a pair of reverse rotation switching elements to a full-time on state and executes an on-off duty control of another, in the reverse manner.

In this case, if the other switching elements, other than a pair of switching elements under operation, generate the closed-circuit fault, electric current is increased. As a result an electric current detection resistance is interposed to detect an excess current. However, there are problems. The electric current detection resistance dissipates electric energy. Further, costs are increased because the electric current detection resistance is expensive.

A method of detecting a maximum value and a minimum value of an electric potential has been proposed in two node points to the forward rotation switching element and the reverse rotation switching element, and detecting the closed-circuit fault of the switching elements by comparing with a threshold value (for example, refer to Japanese Patent No. 3020038). However, because the electric potential maximum value detection circuit and an electric potential minimum value detection circuit are provided in each of two node points to the forward rotation switching element and the reverse rotation switching element, and a means for comparing them is also provided. The circuit is complex and has many parts which increases the cost.

SUMMARY OF THE INVENTION

An object of the present invention is to provide a fault detection apparatus of a direct-current motor drive bridge circuit having a small number of parts and having an extremely simple structure.

The present invention relates to a fault detection apparatus of a direct-current motor drive bridge circuit, in which the direct-current motor drive bridge circuit is structured such that a pair of forward rotation switching elements and a pair of reverse rotation switching elements are alternately annularly connected. A direct-current motor is interposed between diagonal node points in one side, and a power source voltage is applied to a portion between diagonal node points in another side via the existing resistance.

The fault detection apparatus has a fault detection means for detecting an electric potential of the one node point to which the power source voltage is applied via the existing resistance and for detecting a closed-circuit fault of the switching elements on the basis of a fluctuation of the electric potential.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

A description will be given below of one embodiment in accordance with the present invention with reference to FIGS. 1 to 3.

A direct-current motor M driven by a direct-current motor drive bridge circuit 1 in accordance with the present embodiment is used in an electric power steering apparatus of a motor vehicle. A drive force of the direct-current motor M assists the force of a driver required for steering.

Figure 1:
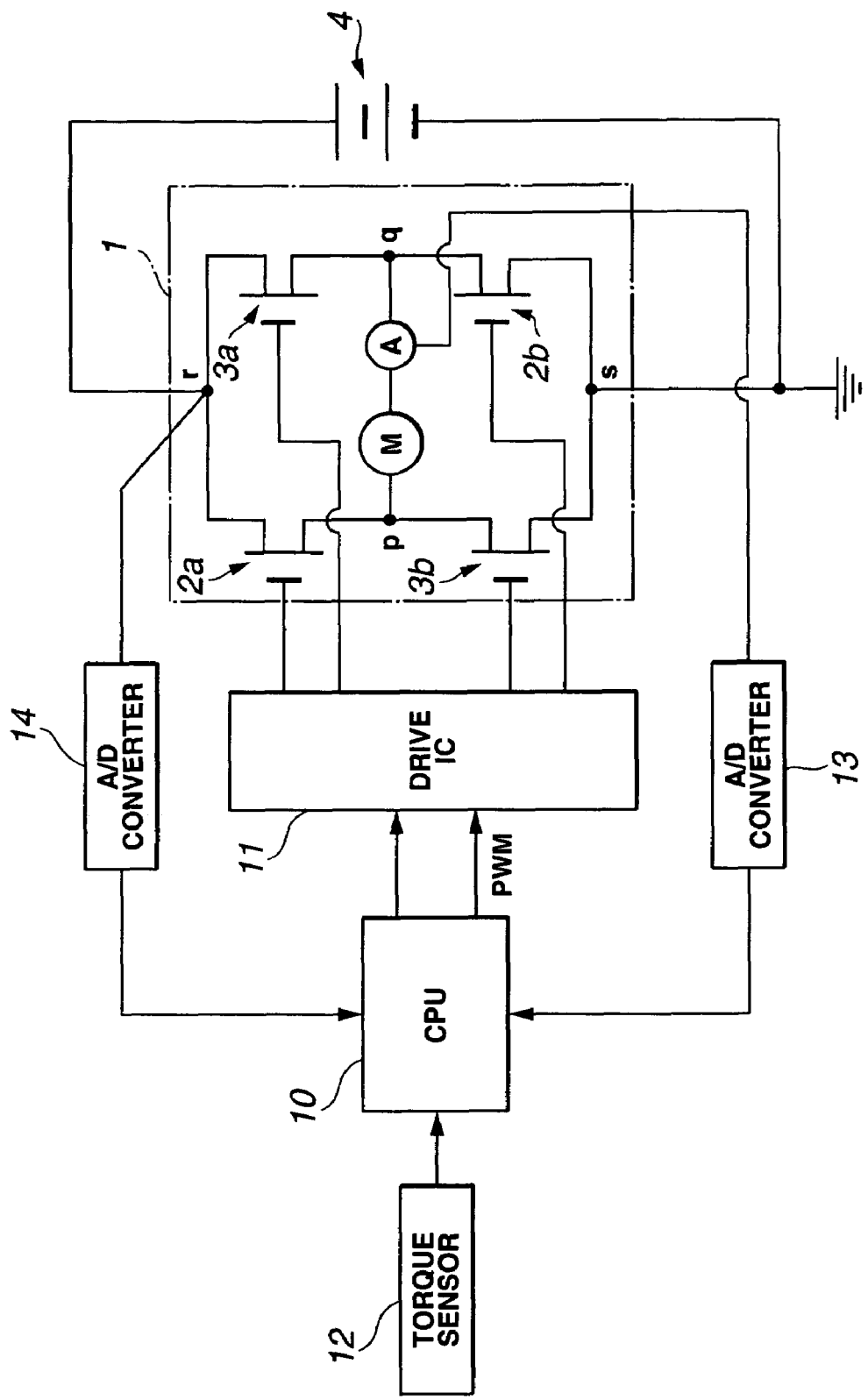
FIG. 1 is a view of an outline structure of a control system of a direct-current motor in accordance with one embodiment of the present invention.

A view of an outline structure of a control system in the direct-current motor M is shown in FIG. 1.

The direct-current motor drive bridge circuit 1 employs a field effect transistor (FET) as a switching element. A pair of forward rotation FETs 2a and 2b and a pair of reverse rotation FETs 3a and 3b are alternately annularly connected. On the bridge circuit, the direct current motor M and an electric current sensor A are interposed in series between diagonal node points p and q in one side. An electric voltage Vo of a battery power source 4 is applied between diagonal node points r and s in another side.

The direct-current motor drive bridge circuit 1 is controlled by a computer. A control instruction signal from a CPU 10 of the computer is input to a IC drive 11. A drive instruction signal is output to each of the forward rotation FETs 2a and 2b and the reverse rotation FETs 3a and 3b by the IC drive 11, and each of the FETs 2a, 2b, 3a and 3b is driven and controlled.

The FETs 2a, 2b, 3a and 3b structure the bridge circuit by connecting drain terminals and source terminals. A gate terminal of each of the FETs 2a, 2b, 3a and 3b is connected to the IC drive 11 so as to be controlled.

A detected torque of a torque sensor 12 detecting a steering torque applied to a steering wheel is input to the CPU 10. The CPU 10 outputs a control instruction signal to the IC drive 11 so as to apply a drive current based on an input detected torque to the direct-current motor M.

In this case, a detected current of the electric current sensor A detecting the electric current flowing through the direct-current motor M is input to the CPU 10 via an A/D converter 13.

Further, an electric potential $V_B$ of the node point r in a side to which a power voltage of the direct-current motor drive bridge circuit 1 is supplied and is input to the CPU 10 via the A/D converter 14.

When driving the direct-current motor M in forward rotation, both pairs of reverse rotation FETs 3a and 3b are set to an off state. The forward rotation FET 2*a* is set to a full-time on state, and an on-off duty control of forward rotation FET 2*b* is executed.

The direct-current motor M is forward rotated by the electric current flowing through the forward rotation FET 2*a*, the direct-current motor M, and the forward rotation FET 2*b* in this order. This determines a duty ratio controlling the forward rotation FET 2*b* in correspondence to the detected torque and which controls the drive current so as to apply a suitable assisting force in correspondence to the steering force to a right side, or a left side, of the driver.

A duty ratio signal PWM for duty control is formed by the CPU 10 and is outputted to the IC drive 11, thereby driving the forward rotation FET 2*b*.

In order to control to the drive current determined in correspondence to the detected torque, the drive signal PWM of a target duty ratio is formed by feeding back the detected current value of the electric current sensor A. The forward rotation FET 2*b* is duty controlled.

When driving the direct-current motor M in reverse rotation, both forward rotation FETs 2*a* and 2*b* are set to an off state. The reverse rotation FET 3*a* is set to a full-time on state, and an on-off duty control of reverse rotation FET 3*b* is executed.

The direct-current motor M is reverse rotated by the electric current flowing through the reverse rotation FET 3*a*, the direct-current motor M, and the reverse rotation FET 3*b* in this order.

A method of control is the same as the case of the forward rotation driving.

In the direct-current motor drive bridge circuit 1 of the control system mentioned above, where the closed-circuit fault is generated in any one of the FETs 2*a*, 2*b*, 3*a* and 3*b*, a fault detection is executed by the CPU 10 on the basis of the electric potential $V_B$ of the node point r.

Here, the electric potential $V_B$ of the node point r is calculated by converting each of the function elements into a resistance value.

On resistances of the FETs 2*a*, 2*b*, 3*a* and 3*b* are set to $R_F$.

A resistance $R_M$ of the direct-current motor M is set to an integrated resistance comprising a motor harness resistance, a motor-on resistance, a fail-safe relay resistance and a coupler contact resistance. A resistance Ro of the battery power source 4 is set to an integrated resistance comprising a power harness resistance, a power relay resistance, a fuse resistance and a coupler contact resistance.

Figure 2:
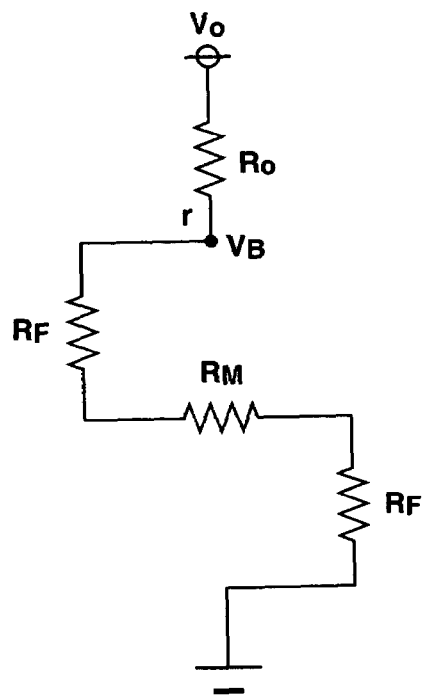
FIG. 2 is a circuit diagram showing a flow of electric current during normal forward rotation drive.

In the normal forward rotation driving mode, since electric current flows through the resistance Ro of the battery power source 4, the on resistance $R_F$ of the forward rotation FET 2*a*, the resistance $R_M$ of the direct-current motor M, and the on resistance $R_F$ of the forward rotation FET 2*b*, in this orders as shown in FIG. 2. The electric potential $V_B$ of the node point r indicates a value that the electric voltage Vo of the battery power source 4 is divided as follows.

At this time, the resistance Ro and the resistance $R_F$ are set to comparatively small resistance values such that a relation Ro≈$R_F$ is established.

Further, the resistance value $R_M$ of the motor M in this case becomes a comparatively large value in comparison with the resistance values Ro and $R_F$.

The electric potential $V_B$ of the node point r during normal forward rotation drive is obtained by the following formula.

$$V_B = Vo(R_F + R_M + R_F)/(Ro + R_F + R_M + R_F)$$
$$= Vo(R_M + 2R_F)/(Ro + R_M + 2R_F)$$
$$\approx Vo$$

If the reverse rotation FET 3*b* generates the closed-circuit fault, a major part of the electric current flowing through the direct-current motor M flows through the reverse rotation FET 3*b* due to a short-circuit of the reverse rotation FET 3*b*. This current also flows through the resistance Ro of the battery power source 4, the on resistance $R_F$ of the forward rotation FET 2*a* and the on resistance $R_F$ of the reverse rotation FET 3*b*, in this order, with reference to FIG. 3.

Accordingly, the electric potential $V_B$ of the node point r when the reverse rotation FET 3*b* generates the closed-circuit fault is obtained by the following formula.

$$V_B = Vo(R_F + R_F)/(Ro + R_F + R_F)$$
$$= Vo(2R_F)/(Ro + 2R_F)$$
$$\approx (2/3)Vo$$

As described above, the electric potential $V_B$ during a closed-circuit fault is reduced in comparison with the electric potential $V_B$ at the normal time. Accordingly, the CPU 10 can detect the closed-circuit fault of the FET on the basis of the rapid reduction of the electric potential $V_B$ in the node point r.

Figure 3:
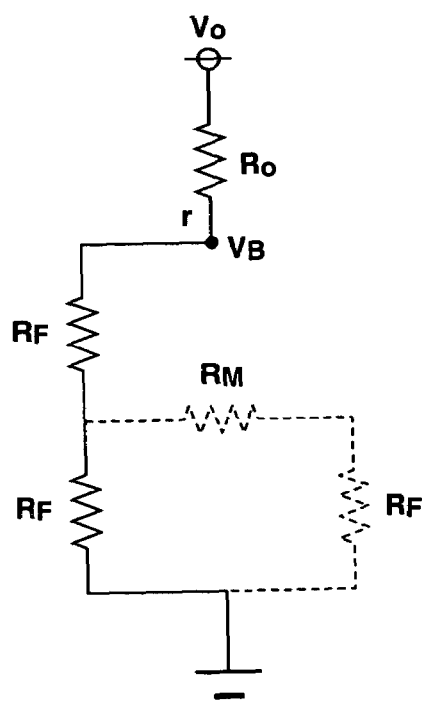
FIG. 3 is a circuit diagram showing a flow of an electric current at a time of closed-circuit fault of a field effect transistor (FET).

The example shown in FIG. 3 corresponds to the case that the reverse rotation FET 3*b* generates the closed-circuit fault. However, when another reverse rotation FET 3*a* generates a closed-circuit fault, the electric potential $V_B$ of the node point r is rapidly reduced in the same manner. Accordingly, the CPU 10 can detect the closed-circuit fault of the reverse rotation FET 3*a*.

Further, the CPU 10 can also detect the closed-circuit fault of the forward rotation FETs 2*a* and 2*b* when driving the direct-current motor M in reverse rotation.

The CPU 10 stops the driving of the direct-current motor M, if the CPU 10 detects the closed-circuit fault of the FET.

The resistance Ro does not always require the relation Ro=RF, but can be suitably regulated in correspondence to a detection sensitivity, and may be regulated by interposing an independent resistance when necessary.

The resistance Ro of the battery power source 4 is the existing resistance. The existing circuit is maintained without adding or changing any members to the direct-current motor drive bridge circuit 1 for detecting the closed-circuit fault. Tt is possible to detect the closed-circuit fault of the FET on the basis of the fluctuation obtained by monitoring the electric potential $V_B$ of one node point r. Accordingly, it is possible to achieve a simple structure having a reduced number of parts, and it is possible to reduce a cost.

In the above embodiment, the present invention relates to a fault detection apparatus of a direct-current motor drive bridge circuit. This direct-current motor drive bridge circuit is structured such that a pair of forward rotation switching elements and a pair of reverse rotation switching elements are alternately connected annularly. A direct-current motor is interposed between diagonal node points in one side, and a power source voltage is applied to a portion between diagonal node points in another side via the existing resistance.

The fault detection apparatus has a fault detection means for detecting an electric potential of the one node point to which the power source voltage is applied via the existing resistance and for detecting a closed-circuit fault of the switching elements on the basis of a fluctuation of the electric potential.

Accordingly, if the switching elements other than a pair of switching elements under operation generate the closed-circuit fault, the electric potential of one node point to which the power source voltage is applied via the existing resistance is lowered. Thus, it is possible to easily detect the closed-circuit fault of the switching element on the basis of the fluctuation of the electric potential.

The existing circuit is maintained without adding or changing any elements of the direct-current motor drive bridge circuit. The simple structure is provided with the fault detection means which detects the closed-circuit fault of the switching elements on the basis of the fluctuation obtained by monitoring the electric potential of one node point. The number of parts is reduced, and it is thereby possible to reduce cost.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

The invention claimed is:

1. A fault detection apparatus of a direct-current motor drive bridge circuit, comprising a direct-current motor drive bridge circuit structured such that a pair of forward rotation switching elements and a pair of reverse rotation switching elements are alternately connected annularly, a direct-current motor interposed between first diagonal node points in one side, and a portion between second diagonal node points in another side via the existing resistance receives an applied power source voltage, and a fault detection means for detecting an electric potential of the one first node point to which the power source voltage is applied via the existing resistance and for detecting a short circuit fault of the switching elements on the basis of a fluctuation of the electric potential, said fault detection means interposed between the second diagonal node points, at least one field effect transistor being utilized in the fault detection, wherein, during normal forward rotation drive, the electric potential $V_B$ of a node point r being determined by the relationship $$V_B = V_O(R_F + R_M + R_F)/(R_O + R_F + R_M + R_F) = V_O(R_M + 2R_F)/(R_O + R_M + 2R_F)$$

where $V_B$ is approximately equal to $V_O$ and when a reverse rotation field effect transistor generates a closed-circuit fault, the electric potential $V_B$ of the node point r being determined by the relationship $$V_B = V_O(R_F + R_F)/(R_O + R_F + R_F) = V_O(2R_F)/(R_O + 2R_F)$$

where $V_B$ is approximately equal to $(2/3)V_O$, and where $V_B$ is the electric potential of a node point, $V_O$ is the electric voltage of the battery power source, $R_O$ is the resistance of the battery power source, $R_M$ is the resistance of the motor, and RF is the on-resistance of each field effect transistor.

2. The fault detection apparatus of a direct-current motor drive bridge circuit according to claim 1, wherein a field effect transistor is employed as each of the switching elements.

3. The fault detection apparatus of a direct-current motor drive bridge circuit according to claim 1, wherein the direct-current motor driven by the direct-current motor drive bridge circuit is used in an electric power steering apparatus of a motor vehicle, and a drive force of the direct-current motor assists a force of the driver required for steering.

4. The fault detection apparatus of a direct-current motor drive bridge circuit according to claim 2, wherein the direct-current motor driven by the direct-current motor drive bridge circuit is used in an electric power steering apparatus of a motor vehicle, and a drive force of the direct-current motor assists a force of the driver required for steering.

5. The fault detection apparatus of a direct-current motor drive bridge circuit according to claim 2, the direct-current motor drive bridge circuit being controllable by a computer, a control instruction signal from a central processing unit of the computer is inputtable to a drive IC, and a drive instruction signal by the drive IC is outputtable to each of the forward rotation field effect transistor and the reverse rotation field effect transistor, wherein each of the transistors is driven and controlled.

6. The fault detection apparatus of a direct-current motor drive bridge circuit according to claim 3, the direct-current motor drive bridge circuit being controllable by a computer, a control instruction signal from a central processing unit of the computer is inputtable to a drive IC, and a drive instruction signal by the drive IC is outputtable to each of the forward rotation field effect transistor and the reverse rotation field effect transistor, wherein each of the transistors is driven and controlled.

7. The fault detection apparatus of a direct-current motor drive bridge circuit according to claim 4, the direct-current motor drive bridge circuit being controllable by a computer, a control instruction signal from a central processing unit of the computer is inputtable to a drive IC, and a drive instruction signal by the drive IC is outputtable to each of the forward rotation field effect transistor and the reverse rotation field effect transistor, wherein each of the transistors is driven and controlled.

* * * * *